United States Patent Office 3,130,158

Patented Apr. 21, 1964

3,130,158

MOLYBDENUM DISULFIDE COMPOSITION

John Joseph Daly, Jr., Wilmington, Del., assignor to E. I. du Pont de Nemours and Company, Wilmington, Del., a corporation of Delaware No Drawing. Filed Jan. 11, 1961, Ser. No. 81,937
2 Claims. (Cl. 252—25)

This invention is directed to a new composition useful as a dry lubricant having improved lubrication properties under increased load. More particularly this invention relates to a lubricant comprising powdered molybdenum disulfide and a small amount of a fluorocarbon telomer.

Solid lubricants are used extensively in the lubrication of bearing surfaces, lathe chucks and other machine tools. In the proper lubrication of moving metal parts, there is present the problem of prevention of galling and seizing when bearing and sliding surfaces are subjected to heavy loads per unit area. For this purpose, powdered molybdenum disulfide has been used as the lubricant in preference to an organic fluid, grease or other dry lubricants. It is well known that molybdenum disulfide has a very low coefficient of friction and is an efficient lubricant for bearings under high pressure. It is therefore surprising that a significantly increased effect on the high load carrying characteristics can be achieved by the addition of a small amount of a fluorocarbon telomer which in itself is not as efficient a lubricant as molybdenum disulfide alone.

It is an object of this invention to provide a significantly improved solid lubricant having increased load carrying characteristics.

It is a further object of this invention to unexpectedly improve the lubricating properties of powdered molybdenum disulfide while still retaining the advantages of a solid lubricant.

These and other objects will become apparent in the following description and claims.

It has been discovered that by incorporating a small amount of a fluorocarbon telomer into powdered molybdenum disulfide, a dry lubricant is obtained which is superior to powdered molybdenum disulfide alone.

More specifically, the present invention is directed to a lubricant composition comprising 100 parts of molybdenum disulfide and at least 1 part of a telomer of tetrafluoroethylene or a telomer of chlorotrifluoroethylene.

A preferred composition comprises 100 parts of molybdenum disulfide and from 1 to 5 parts of said telomer component.

Another preferred composition according to the present invention comprises 100 parts of molybdenum disulfide and from 1 to 5 parts of a telomer of tetrafluoroethylene.

The improved lubricant compositions of the present invention are obtained by adding commercially available powdered molybdenum disulfide to a fluorocarbon telomer dispersed in a solvent and distilling off the solvent. Any powdered molybdenum disulfide easily obtainable on the market is suitable. Pure molybdenum disulfide and molybdenum disulfide containing air-drying or thermosetting resins, such as alkyd, phenolic and epoxy resins, which are commercially available may be used to equal advantage.

The telomers useful in the practice of this invention are obtained by reacting tetrafluoroethylene or chlorotrifluoroethylene with an active telogen. They are grease- or wax-like solids having a molecular weight less than 25,000. Representative telomers which may be utilized in practicing this invention are described in the following references:

U.S. 2,411,158 which describes $H(CF_2CF_2)_nZ$ and $H(CF_2CFCl)_nZ$ where the telogen, ZH, is a saturated aliphatic or cycloaliphatic acid, ester or ketone; U.S. 2,443,003 in which the telogen is an aliphatic or cycloaliphatic thiol, sulfide or disulfide; U.S. 2,433,844 in which the telogen is an aliphatic ether; U.S. 2,540,088 in which the telogen is a saturated alicyclic hydrocarbon; U.S. 2,562,547 in which the telogen is a chlorine containing compound and the telomer has the structure

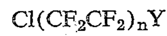

$$Cl(CF_2CF_2)_nY$$

where Y is the radical of the chloro compound; and, U.S. 2,770,659 in which telomers of the structure

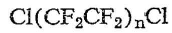

$$Cl(CF_2CF_2)_nCl$$

are described. Other suitable telomers are found in U.S. 2,786,827, U.S. 2,837,580, U.S. 2,820,027, B. 583,874, and D. 1,067,598.

A preferred telomer is that prepared by reacting tetrafluoroethylene in the presence of 1,1,2-trichlorotrifluoroethane, methylcyclohexane, and di-tert-butyl peroxide. By way of illustrating how the telomer may be prepared the following procedure is given. Mixtures of the herein described telomers are operable in practicing the present invention.

A clean, dry stainless steel, steam-jacketed autoclave, equipped with a cooling coil, anchor-type agitator, and intake and discharge tubes, is flushed with nitrogen and filled with a solution of 1,1,2-trichlorotrifluoroethane containing 0.76% by weight of methylcyclohexane and 0.28% by weight of di-tert-butyl peroxide. The take-off valve is set for 600 p.s.i.g. and the temperature raised to 160° C. The above 1,1,2-trichlorotrifluoroethane solution is then fed to the autoclave at a rate of 68.7 lbs. per hour. At the same time tetrafluoroethylene under a pressure of 650 to 750 p.s.i.g. is introduced into the autoclave. When a steady reaction state is reached a dispersion of a tetrafluoroethylene telomer dispersed in 1,1,2-trichlorotrifluoroethane at a solids concentration of about 20% is obtained.

The following representative examples illustrate the preparation of the improved lubricant of the present invention.

EXAMPLE 1

To 2.5 g. of a dispersion of a telomer of tetrafluoroethylene and methylcyclohexane in 1,1,2-trichloro-1,2,2-trifluoroethane at 20% telomer concentration was added 50 g. of 1,1,2-trichlorotrifluoroethane and 5 g. of powdered molybdenum disulfide. The solvent was evaporated on a steam bath with rapid agitation of the mixture. A finely divided powder of molybdenum disulfide was obtained having incorporated therein 0.5 g. of the telomer. The product mixture was in appearance practically identical to the molybdenum disulfide starting material.

EXAMPLE 2

The details of Example 1 were repeated wherein 50 g. of 1,1,2-trichloro-1,2,2-trifluoroethane and 5 g. of molybdenum disulfide were added to 1.25 g. of the fluorotelomer dispersion. A finely divided powder of molybdenum disulfide was obtained having incorporated therein 0.25 g. of the telomer.

EXAMPLE 3

The details of Example 1 were repeated wherein 50 g. of 1,1,2-trichloro-1,2,2-trifluoroethane and 5 g. of molybdenum disulfide were added to 0.25 g. of the fluorotelomer dispersion. A finely divided powder of molybdenum disulfide was obtained having incorporated therein 0.05 g. of the telomer.

In place of the telomer of tetrafluoroethylane used in the above examples, telomers of tetrafluoroethylene and chlorotrifluoroethylene with other telogens may be used. Suitable telogens are other hydrocarbons, halogenated alkanes, such as chloroform or carbon tetrachloride, alcohols, acids, ketones, ethers, aliphatic thiols, sulfides, disulfides, siloxanes, and phosphites; telomers of chlorotrifluoroethylene with sulfuryl chloride, fluoride or bromide may also be used.

It is understood that the minimum limit of telomer, utilized according to the present invention, may be ½% or less and still be effective.

The effectiveness of the molybdenum disulfide mixtures of the present invention as lubricants was determined by a Falex test, which is described in "Lubricant Testing," by E. G. Ellis, Scientific Publications, Great Britain, 1953, pp. 150–153. The Falex tester consists of a motor driven vertical shaft to which is attached the test pin, which runs between two V-shaped bearing blocks. The tests were conducted for a two-minute wear-in period at 250 pounds jaw load. The eccentric arm was engaged and the jaw load automatically increased to the point of failure. Failure was a result of pin shearing or journal wear-through. The bushings used were the standard Falex type A151–C–1137, Rockwell C–20, and the journals were of Rockwell hardness B–102. In order to test relatively small amounts of dry lubricant and maintain an adequate supply of powder at the journal-bushing interface, the conventional Falex lubricant container (minimum 70 cc. liquid capacity) was removed. The bearing blocks were taped together to form a small enclosure which allowed the testing of less than 5 g. of dry powder. The test involves the failure of a lubricant to carry a load as evidenced by the seizure of the test pin and bushings or a sudden increase in torque reading.

In Table I which follows are summarized the results of Falex tests conducted on molybdenum disulfide containing varying amounts of telomer as well as on the molybdenum disulfide and telomer alone. Molybdenum disulfide containing polytetrafluoroethylene was also tested.

naturally occurring mineral high in $MoS_2$ content. A further description of the properties of $MoS_2$ and its application as a lubricant is found in the Plant Engineering Handbook, W. Staniar ed., 2nd edition, N.Y., McGraw-Hill, 1959, pp. 26–52.

The fluorocarbon telomer itself when tested melted, running off the bearing and journal, smoking excessively. It is therefore unexpected that the addition of the telomer to molybdenum disulfide would produce such a remarkable improvement in lubricating characteristics.

Not only is molybdenum disulfide itself improved by the addition of the fluorocarbon telomer, but also molybdenum disulfide containing a resin, such as the commercially available products consisting of molybdenum disulfide and an air-drying or thermosetting resin, are benefited by such addition.

The composition of the present invention can be used to better advantage than molybdenum disulfide alone in many lubrication applications, for example, on highly-loaded roller-ball and thrust bearings, gears, threads, sliding ways, and in drilling, milling, broaching, thread-cutting, stamping, extrusion, compaction and cutting operations; this lubricant may also be applied as an additive to oils, greases, plastic, rubber and fiber compositions.

The embodiments of the invention in which an exclusive property or privilege is claimed are defined as follows:

1. A lubricant composition consisting essentially of 100 parts of molybdenum disulfide and from about .5 to 10 parts of a telomer having the formula $X(CF_2CFZ)_nY$ wherein X is a member selected from the group consisting of hydrogen and halogen; Z is a member selected from the group consisting of fluorine and chlorine; Y is a monovalent saturated organic radical; *n* is an integer from 5 to 200, said telomer having a molecular weight not exceeding 25,000.

2. A lubricant composition according to claim 1 containing from 1 to 5 parts of said telomer component.

*Table I*

FALEX TEST

| Lubricant | Max. Fail Load (lbs.) | Torque at Fail (in.-lb.) | Bushings | Journal | Pin Sheared |
|---|---|---|---|---|---|
| $MoS_2$ | 3,250 | 80 | scar—1 to 2 mm | moderate wear grooving. | yes. |
| $MoS_2$+10% telomer | >4,500 | 30 | scar <1 mm | do | no. |
| $MoS_2$+5% telomer | >4,500 | 24 | do | do | ho. |
| $MoS_2$+1% telomer | >4,500 | 30 | do | do | no. |
| Telomer of TFE and methyl-cyclo-hexane. | melted, smoked at about 3,500. | | | | |
| $MoS_2$+10% polytetra-fluoroethylene. | 2,950 | 110 | scar <1 mm | high wear | yes. |

It can be seen from the preceding table that the incorporation of even 1% telomer into molybdenum disulfide markedly improves the load carrying ability to the maximum test load of 4500 pounds, with accompanying decrease in wear of bushings and considerable reduction in torque. The tests also indicate that the pin sheared using molybednum disulfide alone, but did not after the addition of the telomer.

The molybdenum disulfide significantly and unexpectedly improved according to this invention has the structure $MoS_2$ and is commonly known as molybdenite, a

References Cited in the file of this patent

UNITED STATES PATENTS

| | | |
|---|---|---|
| 2,411,159 | Hanford | Nov. 19, 1946 |
| 2,562,547 | Hanford et al. | July 31, 1951 |
| 2,685,707 | Llewellyn et al. | Aug. 10, 1954 |
| 2,964,476 | Coad | Dec. 13, 1960 |
| 3,014,865 | Seniff et al. | Dec. 26, 1961 |

FOREIGN PATENTS

| | | |
|---|---|---|
| 794,982 | Great Britain | May 14, 1958 |